(No Model.) 3 Sheets—Sheet 1.
J. G. HAACKER
CUT-OFF VALVE.
No. 282,630. Patented Aug. 7, 1883.
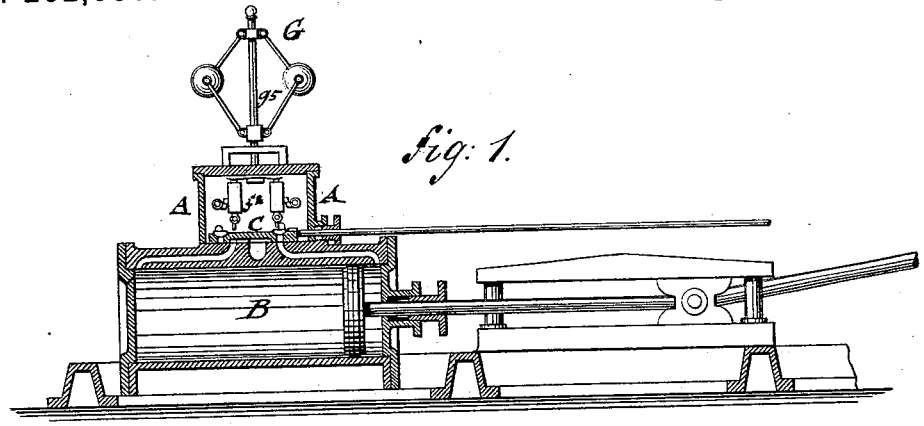
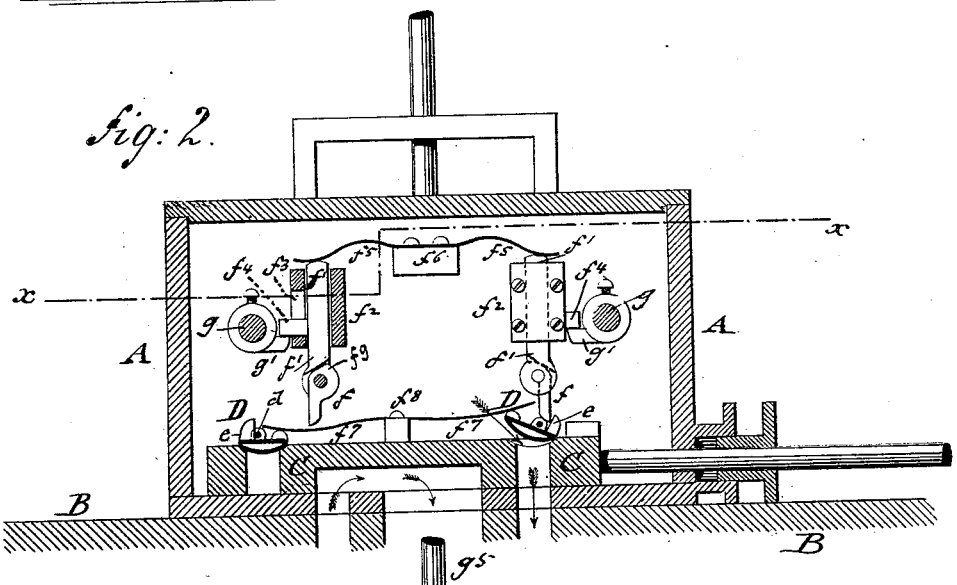
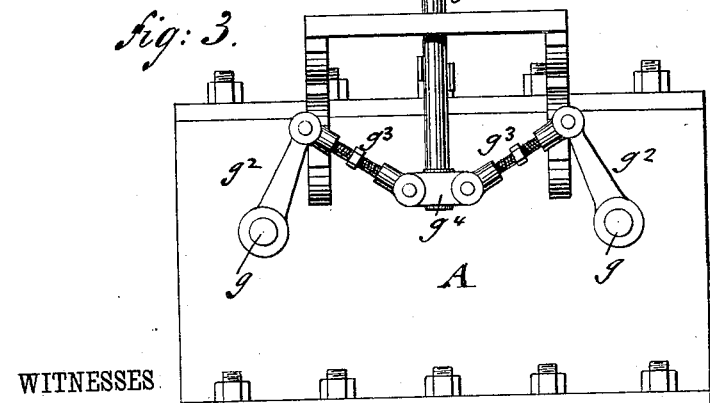
WITNESSES
A. Schehl.
Otto Risch
INVENTOR
J. G. Haacker
BY Paul Goepel
ATTORNEY

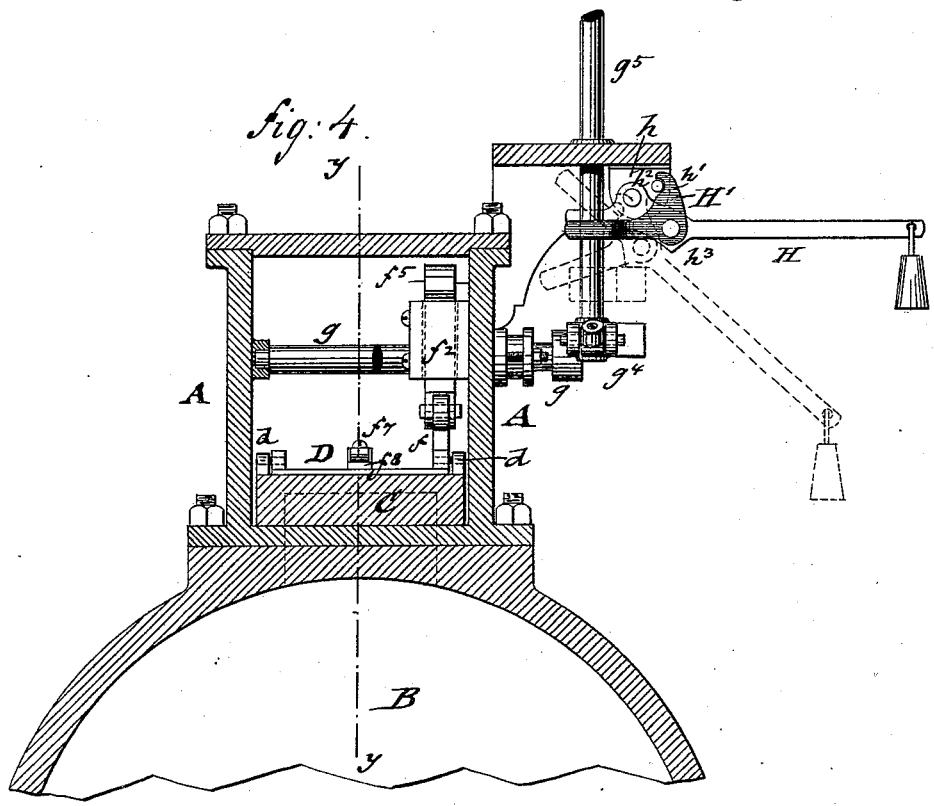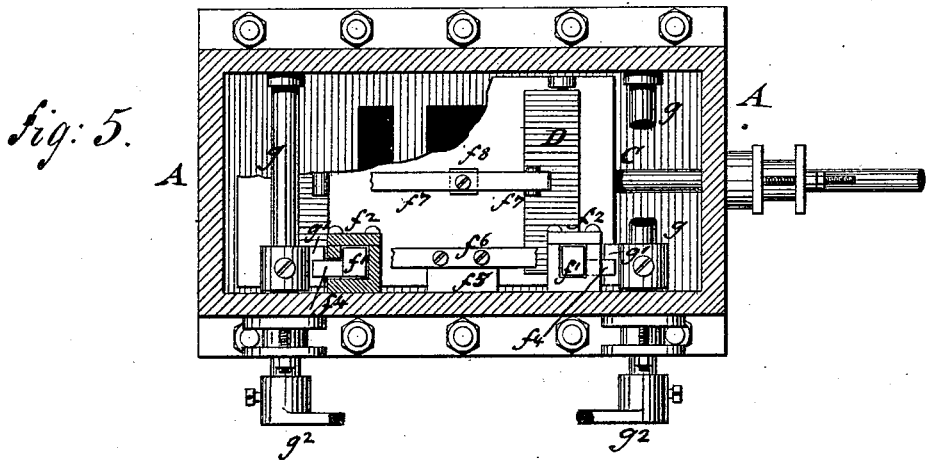

(No Model.) 3 Sheets—Sheet 3.
J. G. HAACKER.
CUT-OFF VALVE.
No. 282,630. Patented Aug. 7, 1883.
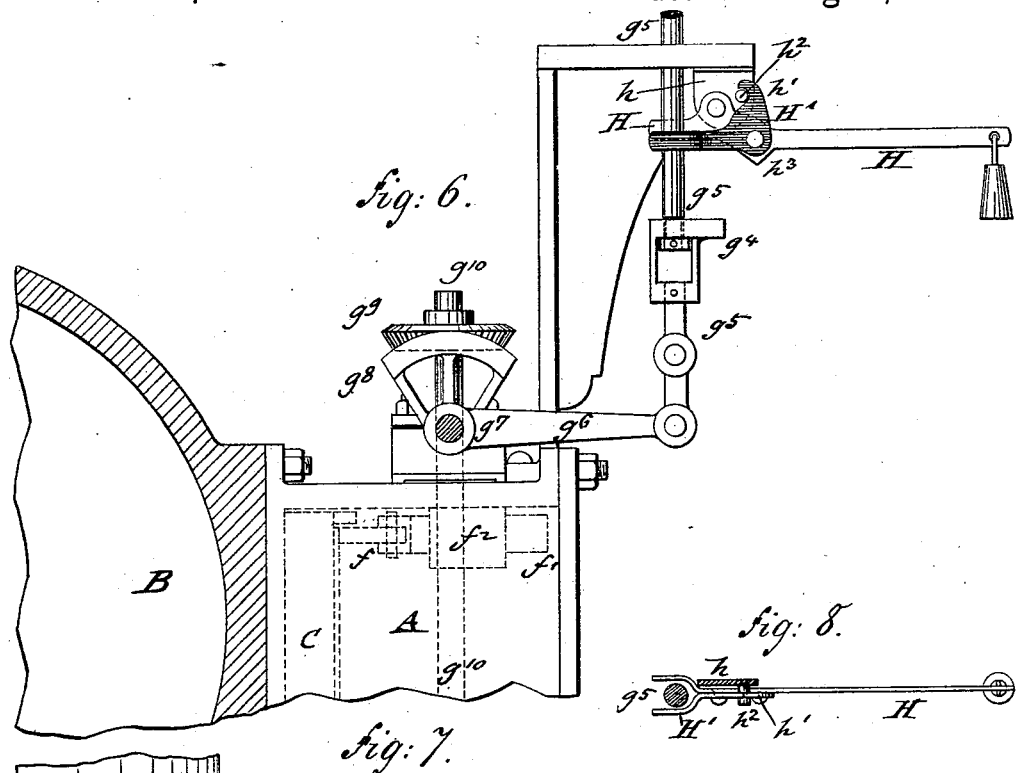
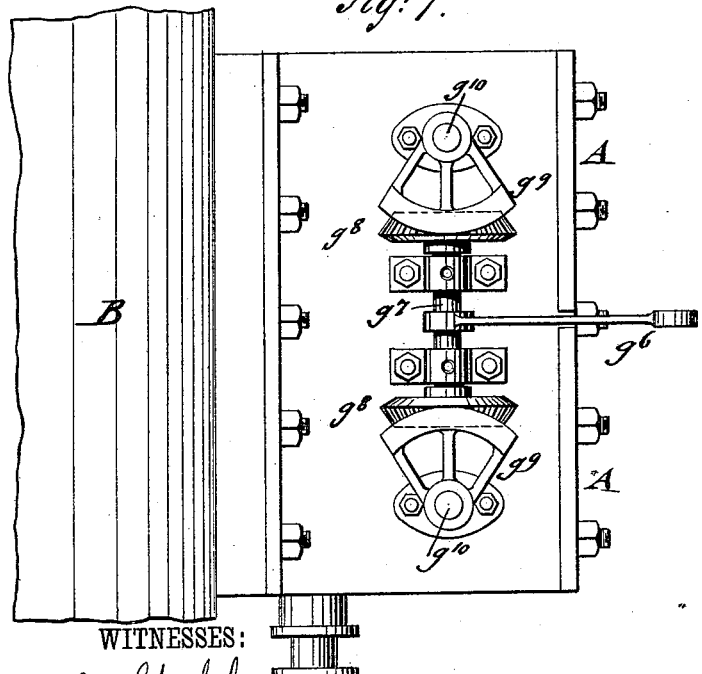
WITNESSES:
A. Schehl.
Otto Risch.
INVENTOR
John G. Haacker
BY Paul Goepel
ATTORNEY

UNITED STATES PATENT OFFICE.

JOHN G. HAACKER, OF NEW YORK, N. Y.

CUT-OFF VALVE.

SPECIFICATION forming part of Letters Patent No. 282,630, dated August 7, 1883.

Application filed March 26, 1883. (No model.)

*To all whom it may concern:*

Be it known that I, JOHN G. HAACKER, of the city, county, and State of New York, have invented certain new and useful Improvements in Cut-Off Valves, of which the following is a specification.

This invention has reference to an improved cut-off slide-valve, in which the cut-off of the steam is effected by the governor, which is so connected to the cut-off valves by intermediate mechanism as to modify the supply of steam in such a manner that by an acceleration of speed a smaller quantity of steam is admitted, while by a diminution of speed a larger quantity of steam is supplied to the cylinder, and thereby the speed regulated in a uniform manner and proportion to the power to be used at the time.

The invention consists of a steam-chest the slide-valve of which is arranged with oscillating cut-off valves that are connected by intermediate mechanism, hereinafter described, with the governor-rod, said intermediate mechanism engaging the cut-off valves and opening them more or less, according as the speed of the engine is decreased or accelerated.

The invention consists, further, of a safety device connected to the governor-rod, whereby the latter is retained in a fixed position, so as to admit only the medium opening or closing of the cut-off valves whenever, for any reason, the driving-belt of the governor should break.

In the accompanying drawings, Figure 1 represents a vertical longitudinal section of a steam-engine with my improved cut-off slide-valve arranged on the top of the same. Fig. 2 is a vertical longitudinal section on line $y\,y$; Fig. 4, of the cut-off slide-valve and its steam-chest drawn on a larger scale; Fig. 3, a side elevation of the same; Fig. 4, a vertical transverse section; Fig. 5, a horizontal section on line $x\,x$, Fig. 2, with part of the slide-valve broken away. Figs. 6 and 7 are an end elevation and a plan of my improved cut-off slide-valve, in which the steam-chest is arranged at the side of the cylinder; and Fig. 8 is a detail plan of the mechanism for retaining the governor-rod in case the actuating-belt of the governor-rod should break.

Similar letters of reference indicate corresponding parts.

In the drawings, A represents the steam-chest of my improved cut-off slide-valve, which steam-chest is arranged either on top of the horizontal steam-cylinder B or at one side thereof, as shown, respectively, in Figs. 1 and 6.

The slide-valve C is arranged at the interior of the steam-chest, and provided with the usual ports that communicate with the steam induction and exhaust ports of the cylinder. It is actuated, in the usual manner, by an eccentric and connecting rod from the driving crank-shaft of the steam-engine. The steam-induction ports of the slide-valve C are provided with oscillating cut-off valves D D, which are hinged to side lugs, $d$, of the slide-valve C, said cut-off valves being preferably convexly curved at their under side, and provided at one side with upwardly-projecting lugs $e\,e$. The lugs $e\,e$ are engaged by pendent fingers $f\,f$, that are pivoted to the lower ends of vertically-sliding rods $f'\,f'$, which are guided in fixed casings $f^2$ of one of the side walls of the steam-chest A. Each guide-casing $f^2$ is provided with a side slot, $f^3$, through which projects a horizontal lug, $f^4$, of the rod $f'$. These lugs are engaged by fixed cams $g'$ of transverse shafts $g$, that turn in bearings of the side walls of the steam-chest A. The shafts $g$ are extended through one of the side walls to the outside, and connected by exterior cranks, $g^2$, and intermediate adjustable connecting-rods, $g^3$, with a cross-piece, $g^4$, at the lower end of the governor-rod $g^5$.

A centrifugal governor, G, of any approved construction, is arranged above the steam-chest A, or sidewise of the same, as the case may be. It serves by the intermediate mechanism that connects the governor-rod with the transverse shafts $g$ to lift the vertically-sliding rods $f'$ and the pendent fingers $f$ to a greater or less extent, according to the quicker or slower speed of the engine. The quicker the speed of the engine the lower will be the position of the fingers $f\,f$, while the slower the speed of the engine the higher will be the position of the fingers.

The cut-off valves D, also the vertical guiderod $f'$, are acted upon by means of band-springs $f^5$ and $f^6$, the former being secured to a bracket, $f^7$, the latter to a raised seat, $f^8$, of the slide-valve, whereby the regular working of the valves D D is kept up without relying entirely on the gravity of these parts. The pendent fingers $f$ are provided above their pivots with heels $f^9$, as shown in Fig. 2, which heels abut against the inclined middle portions of the rods $f'$, so that the fingers are held in a fixed position when they are attempted to be turned in one direction, but are capable of swinging around their pivot when they are acted upon from the opposite direction. The projecting lugs $e$ of the cut-off valves D D are alternately engaged by the fingers $f\,f$, and are thereby turned around their pivots, so as to open the steam-ports. When the slide-valve moves in opposite direction, the finger $f$ passes freely over the lug $e$ of the valve D without exerting a lifting action of the same. The greater the speed of the engine the more the weighted balls of the governor are thrown apart by centrifugal force, and consequently, by the action of the intermediate mechanism, the valve-operating fingers are lifted. In the raised position of the fingers the valves are held open for a less length of time than when they are in a lowered position, so that consequently a smaller quantity of steam is admitted to the cylinder, and thereby the speed of the engine decreased. As the cut-off valves D are quickly opened and closed, even after the induction-ports of the cylinder have been partly opened by the slide-valve, the steam enters directly with full force, while it is in a similar manner instantly shut off at the moment when the cut-off valve is closed, so as to admit thereby, to some extent, of the expansive working of the steam in the cylinder. If the speed of the engine diminishes, the governor-rod will descend, the lifting-cams, slide-rods, and actuating-fingers are lowered, consequently the valves opened for a longer time, so that more steam can pass to the engine, by which the speed is increased. In this manner, by the play of the governor and the intermediate mechanism connecting the same with the cut-off slide-valve, the speed of the engine is regulated and kept at a uniform rate.

When the steam-chest A and slide-valve C are arranged sidewise of the steam-cylinder B, a different construction of the intermittent transmitting mechanism has to be used, which is shown in Figs. 6 and 7. In this case the governor-rod $f^5$ is connected by a lever, $g^6$, with a longitudinal shaft, $g^7$, turning in bearings on the top of the steam-chest. The shaft $g^7$ engages, by bevel-segments $g^8$ at its ends, horizontal bevel-segments $g^9$ of vertical shafts $g^{10}$, which pass through the top plate of the steam-chest to the interior of the same. The shafts $g^{10}$ engage, by cams at their lower end, the lugs of horizontally-guided slide-rods $f'\,f'$, having pivoted fingers $f\,f$, of the same construction as shown in Fig. 2, which fingers actuate the vertically-hinged and spring-pressed cut-off valves D D of the slide-valve C in the same manner as when the steam-chest is located at the top of the cylinder.

The intermediate mechanism last described is in all respects the equivalent to the transmitting mechanism shown in Figs. 2 and 3. Any other suitable mechanism for connecting the governor-rod with the actuating slide-rods of the fingers may be used.

Provision has to be made by which the opening of the cut-off valves D to too great an extent may be prevented in case the main transmitting-belt should break or slip. This is accomplished by the safety mechanism shown in Figs. 4, 6, and 8, which consists of a weighted lever, H, that is fulcrumed to a bracket-plate, $h$, at the under side of the supporting-plate of the governor. Lever H is held in normal position by an elbow-lever, H', that is fulcrumed to the lever H, said elbow-lever engaging, by a hook, $h'$, at its upper end, a fixed pin, $h^2$, of the bracket-plate $h$, to which the lever H is applied. A heel, $h^3$, of the lever H, below the fulcrum of the elbow-lever H', serves to engage the cross-piece $g^4$ whenever the weighted lever H is dropped by the release of the elbow-lever H' from the pin $h^2$. The release of the elbow-lever H' takes place by the lifting action of the cross-piece $g^4$ thereon in case the main belt should break or slip. The immediate effect of the breaking or slipping off of the main belt would be the sudden throwing out of the centrifugal balls to their full extent, and a corresponding lifting of the governor-rod and its cross-piece. By the upward motion of the governor-rod $g^5$ its cross-piece $g^4$ strikes the elbow-lever H' and releases its hook end $h'$ from the pin $h^2$. This causes the almost instant dropping of the weighted lever H, whereby the heel $h^3$ engages the cross-piece $g^4$, as shown in dotted lines in Fig. 4, and retains the governor-rod in such a position that a dangerously high speed of the engine is prevented and a medium speed of the same kept up.

By the safety device any damage to the engine by the accidental breakage of the main belt is thereby avoided.

Having thus described my invention, I claim as new and desire to secure by Letters Patent—

1. The combination of a steam-chest, an interior slide-valve having oscillating cut-off valves, interior vertically-movable slide-rods and pendent fingers, whereby the cut-off valves are actuated, intermediate mechanism by which the interior slide-rods are connected to the governor-rod, so that the speed of the engine is regulated by the raising or lowering of the governor-rod, and springs for depressing said cut-off valves and rods, substantially as set forth.

2. The combination of a steam-chest, an interior slide-valve, oscillating cut-off valves on said slide-valve, having upwardly-projecting lugs, vertical slide-rods $f'$, provided with pivoted fingers $f$, which alternately engage and clear said lugs during the movement of the slide-valve, and with laterally-projecting lugs $f^4$, shafts $g$, provided with lifting-cams $g'$, which engage said laterally-projecting lugs, a centrifugal governor, and mechanism for connecting the governor-rod with the shaft $g$, substantially as set forth.

3. The combination of a steam-chest, an interior slide-valve having oscillating cut-off valves, mechanism for alternately oscillating the cut-off valves, intermediate mechanism by which the actuating mechanism of the cut-off valves is connected with the governor-rod, and means connected to the governor-rod whereby the same is retained at a certain fixed position in case the main belt should break or slip, substantially as specified.

4. The combination of a steam-chest, an interior slide-valve, oscillating cut-off valves on said slide-valve, having upwardly-projecting lugs, vertical slide-rods $f'$, provided with pivoted fingers $f$, which alternately engage and clear said lugs during the movement of the slide-valve, and with laterally-projecting lugs $f^4$, a spring, $f^5$, for depressing said slide-rods, shafts $g$, provided with lifting-cams $g'$, which engage said laterally-projecting lugs, a centrifugal governor, and mechanism connecting the governor-rod with the shaft $g$, substantially as described.

5. The combination, with a governor and governor-rod, of a weighted lever fulcrumed to a bracket-plate of the governor-support, an elbow-lever fulcrumed to the weighted lever, and having a hook-shaped end engaging a stud of the bracket-plate, the weighted lever having a heel that engages a cross-piece of the governor-rod whenever the elbow-lever is released by the breaking or slipping of the main belt, substantially as described.

In testimony that I claim the foregoing as my invention I have signed my name in presence of two subscribing witnesses.

JOHN G. HAACKER.

Witnesses:
PAUL GOEPEL,
SIDNEY MANN.